United States Patent
Kang et al.

(10) Patent No.: US 6,947,252 B2
(45) Date of Patent: Sep. 20, 2005

(54) WAVE STRINGER FOR CONTROLLING ACOUSTIC NOISE AND SHOCK VIBRATION IN A STORAGE DEVICE

(75) Inventors: Seong-Woo Kang, Santa Clara, CA (US); Tae-Yeon Hwang, Cupertino, CA (US); Yun-Dik Han, Santa Clara, CA (US); Young Son, San Jose, CA (US); Woocheol Jeong, Santa Clara, CA (US)

(73) Assignee: Samsung Electronics Co., Ltd., Suwon (KR)

(*) Notice: Subject to any disclaimer, the term of this patent is extended or adjusted under 35 U.S.C. 154(b) by 203 days.

(21) Appl. No.: 09/850,958

(22) Filed: May 7, 2001

(65) Prior Publication Data

US 2002/0008933 A1 Jan. 24, 2002

Related U.S. Application Data

(60) Provisional application No. 60/202,551, filed on May 10, 2000.

(51) Int. Cl.[7] .............................................. G11B 33/08
(52) U.S. Cl. ................................................... 360/97.02
(58) Field of Search .......................... 360/97.01, 97.02, 360/97.03

(56) References Cited

U.S. PATENT DOCUMENTS

| | | | |
|---|---|---|---|
| 3,558,831 A | 1/1971 | Prescott et al. | |
| 4,110,802 A | 8/1978 | Ho et al. | |
| 4,280,156 A | 7/1981 | Villette | |
| 4,491,888 A | * 1/1985 | Brown et al. | ............ 360/97.03 |
| 4,493,554 A | 1/1985 | Pryor et al. | |
| 4,555,739 A | 11/1985 | Le Van et al. | |
| 4,562,500 A | 12/1985 | Bygdnes | |
| 4,630,926 A | 12/1986 | Tanaka et al. | |
| 4,661,873 A | 4/1987 | Schulze | |
| 4,673,996 A | 6/1987 | White | |
| 4,703,376 A | 10/1987 | Edwards et al. | |

(Continued)

FOREIGN PATENT DOCUMENTS

| | | |
|---|---|---|
| EP | 0 426 353 A2 | 5/1991 |
| EP | 0 463 752 A2 | 1/1992 |
| EP | 0 491 563 A2 | 6/1992 |
| EP | 0 582 464 A2 | 2/1994 |
| EP | 0 801 387 A2 | 10/1997 |
| FR | 2518-791 A | 6/1983 |
| GB | 2 050 670 A | 1/1981 |
| GB | 2 100 052 A | 12/1982 |
| GB | 2 326 755 A | 12/1998 |
| JP | 632 344 55 | 9/1988 |
| JP | 01245479 A | 9/1989 |
| JP | 3-83281 | 4/1991 |
| JP | 3-104079 | 5/1991 |
| JP | 06012635 A | 1/1994 |
| JP | 09251769 A | 9/1997 |
| JP | 9-293370 | 11/1997 |
| JP | 10-320964 | * 12/1998 |
| WO | WO 93/10494 | 5/1993 |
| WO | WO 96/34390 | 10/1996 |

OTHER PUBLICATIONS

US 6,091,569, 7/2000, Allsup et al. (withdrawn)

*Primary Examiner*—Craig A. Renner
(74) *Attorney, Agent, or Firm*—Ben J. Yorks; Jeffrey P. Aiello; Irell & Manella LLP

(57) ABSTRACT

A hard disk drive that includes a wave stringer. The wave stringer can attenuate energy which propagates through a base plate of the disk drive. The wave stringer may be designed by initially analyzing propagation patterns of both acoustic and shock waves applied to the drive. The wave stringer is then designed, constructed and assembled to the disk drive to attenuate critical frequencies at weak points of the disk drive. The wave stringer may have a plurality of ribs designed to vary the mechanical impedance of the drive to attenuate the propagated energy.

11 Claims, 4 Drawing Sheets

U.S. PATENT DOCUMENTS

| | | | |
|---|---|---|---|
| 4,731,777 A | 3/1988 | Yoshitoshi et al. | |
| 4,739,425 A | 4/1988 | Dierkes et al. | |
| 4,784,012 A | 11/1988 | Marra | |
| 4,794,588 A | 12/1988 | Yoshitoshi et al. | |
| 4,802,042 A | 1/1989 | Strom | |
| 4,819,105 A | 4/1989 | Edwards | |
| 4,839,756 A | 6/1989 | Chew et al. | |
| 4,866,553 A | 9/1989 | Kubo et al. | |
| 4,870,519 A | 9/1989 | White | |
| 4,890,172 A | 12/1989 | Watt et al. | |
| 4,949,206 A | 8/1990 | Phillips et al. | |
| 4,958,337 A | 9/1990 | Yamanaka et al. | |
| 4,982,300 A | 1/1991 | Forbord | |
| 5,004,207 A | 4/1991 | Ishikawa et al. | |
| 5,021,905 A | 6/1991 | Sleger | |
| 5,029,026 A | 7/1991 | Stefansky et al. | |
| 5,062,017 A | 10/1991 | Strom et al. | |
| 5,097,370 A | 3/1992 | Hsia | |
| 5,128,822 A | 7/1992 | Chapin et al. | |
| 5,130,870 A | 7/1992 | Jabbari | |
| 5,149,048 A * | 9/1992 | Morehouse et al. | 248/632 |
| 5,159,508 A | 10/1992 | Grill et al. | |
| 5,161,900 A | 11/1992 | Bougathou et al. | |
| 5,167,167 A | 12/1992 | Tiernan, Jr. et al. | |
| 5,175,661 A | 12/1992 | Mizuno et al. | |
| 5,187,621 A | 2/1993 | Tacklind | |
| 5,200,868 A | 4/1993 | Chapin et al. | |
| 5,202,803 A | 4/1993 | Albrecht et al. | |
| 5,214,549 A | 5/1993 | Baker et al. | |
| 5,216,582 A | 6/1993 | Russell et al. | |
| 5,235,482 A * | 8/1993 | Schmitz | 360/97.02 |
| 5,241,438 A | 8/1993 | Matsushima | |
| 5,243,495 A | 9/1993 | Read et al. | |
| 5,247,493 A | 9/1993 | Kime et al. | |
| 5,262,911 A | 11/1993 | Cain et al. | |
| 5,262,913 A | 11/1993 | Stram et al. | |
| 5,267,109 A | 11/1993 | Chapin et al. | |
| 5,274,519 A | 12/1993 | Saito et al. | |
| 5,287,235 A | 2/1994 | Cunningham et al. | |
| 5,293,282 A | 3/1994 | Squires et al. | |
| 5,309,303 A | 5/1994 | Hsia et al. | |
| 5,319,511 A | 6/1994 | Lin | |
| 5,333,085 A | 7/1994 | Prentice et al. | |
| 5,343,343 A | 8/1994 | Chapin | |
| 5,347,414 A | 9/1994 | Kano | |
| 5,365,389 A | 11/1994 | Jabbari et al. | |
| 5,369,538 A | 11/1994 | Moe et al. | |
| 5,396,386 A | 3/1995 | Bolasna et al. | |
| 5,396,387 A | 3/1995 | Murray | |
| 5,402,290 A | 3/1995 | Daniel | |
| 5,404,256 A | 4/1995 | White | |
| 5,410,402 A | 4/1995 | Li et al. | |
| 5,422,776 A | 6/1995 | Thorson et al. | |
| 5,426,562 A | 6/1995 | Morehouse et al. | |
| 5,442,638 A | 8/1995 | Awad et al. | |
| 5,446,611 A | 8/1995 | Webber | |
| 5,455,728 A | 10/1995 | Edwards et al. | |
| 5,460,017 A | 10/1995 | Taylor | |
| 5,463,527 A | 10/1995 | Hager et al. | |
| 5,469,311 A | 11/1995 | Nishida et al. | |
| 5,519,552 A | 5/1996 | Kohira et al. | |
| 5,537,272 A | 7/1996 | Kazmierczak et al. | |
| 5,546,250 A | 8/1996 | Diel | |
| 5,555,144 A | 9/1996 | Wood et al. | |
| 5,570,249 A | 10/1996 | Aoyagi et al. | |
| 5,590,095 A | 12/1996 | Chaya | |
| 5,610,776 A | 3/1997 | Oh | |
| 5,612,841 A | 3/1997 | Johnson | |
| 5,636,090 A | 6/1997 | Boigenzahn et al. | |
| 5,663,853 A | 9/1997 | Park | |
| 5,673,158 A | 9/1997 | Ichimura | |
| 5,677,813 A | 10/1997 | Yoshida et al. | |
| 5,703,734 A | 12/1997 | Berberich et al. | |
| 5,754,353 A | 5/1998 | Behrens et al. | |
| 5,757,580 A * | 5/1998 | Andress et al. | 360/97.02 |
| 5,760,998 A | 6/1998 | Berberich et al. | |
| 5,768,249 A | 6/1998 | Ro et al. | |
| 5,781,373 A | 7/1998 | Larson et al. | |
| 5,801,899 A | 9/1998 | Genheimer | |
| 5,815,349 A | 9/1998 | Frater | |
| 5,822,139 A | 10/1998 | Ayabe | |
| 5,831,795 A | 11/1998 | Ma et al. | |
| 5,844,754 A | 12/1998 | Stefansky et al. | |
| 5,844,911 A | 12/1998 | Schadegg et al. | |
| 5,875,067 A | 2/1999 | Morris et al. | |
| 5,885,005 A | 3/1999 | Nakano et al. | |
| 5,886,851 A | 3/1999 | Yamazaki et al. | |
| 5,901,017 A | 5/1999 | Sano et al. | |
| 5,926,347 A | 7/1999 | Kouhei et al. | |
| 5,930,079 A | 7/1999 | Vera et al. | |
| 5,930,080 A | 7/1999 | Frater et al. | |
| 5,936,927 A | 8/1999 | Soga et al. | |
| 5,969,901 A | 10/1999 | Eckberg et al. | |
| 5,987,733 A | 11/1999 | Goss | |
| 6,011,670 A | 1/2000 | Balsley, Jr. et al. | |
| 6,034,841 A | 3/2000 | Albrecht et al. | |
| 6,034,941 A | 3/2000 | Ro | |
| 6,046,883 A | 4/2000 | Miller | |
| 6,055,134 A | 4/2000 | Boutaghou | |
| 6,084,744 A | 7/2000 | Genheimer et al. | |
| 6,088,192 A | 7/2000 | Riener et al. | |
| 6,088,194 A | 7/2000 | Imaino et al. | |
| 6,088,202 A | 7/2000 | Kabasawa et al. | |
| 6,091,576 A | 7/2000 | Eckerd et al. | |
| 6,108,163 A | 8/2000 | Boutaghou | |
| 6,115,214 A | 9/2000 | Allsup et al. | |
| 6,122,138 A * | 9/2000 | Khanna et al. | 360/97.02 |
| 6,154,360 A | 11/2000 | Kaczeus, Sr. et al. | |
| 6,157,522 A | 12/2000 | Murphy et al. | |
| 6,166,901 A | 12/2000 | Gamble et al. | |
| 6,181,525 B1 | 1/2001 | Carlson | |
| 6,185,075 B1 | 2/2001 | Tsujino et al. | |
| 6,185,807 B1 | 2/2001 | Kazmierczak et al. | |
| 6,191,915 B1 | 2/2001 | Takagi et al. | |
| 6,198,606 B1 | 3/2001 | Boutaghou et al. | |
| 6,201,668 B1 | 3/2001 | Murphy | |
| 6,205,005 B1 | 3/2001 | Heath | |
| 6,212,029 B1 | 4/2001 | Fioravanti | |
| 6,226,143 B1 | 5/2001 | Stefanksy | |
| 6,226,145 B1 | 5/2001 | Genheimer et al. | |
| 6,226,152 B1 | 5/2001 | Tanaka et al. | |
| 6,226,153 B1 | 5/2001 | Tokuyama et al. | |
| 6,229,668 B1 | 5/2001 | Huynh et al. | |
| 6,233,124 B1 | 5/2001 | Budde et al. | |
| 6,236,531 B1 | 5/2001 | Allsup et al. | |
| 6,239,943 B1 | 5/2001 | Jennings et al. | |
| 6,266,212 B1 | 7/2001 | Coon | |
| 6,288,866 B1 * | 9/2001 | Butler et al. | 360/97.01 |
| 6,411,463 B1 * | 6/2002 | Janik et al. | 360/97.01 |
| 6,487,039 B1 * | 11/2002 | Bernett | 360/97.02 |
| 6,674,608 B1 * | 1/2004 | Bernett | 360/97.01 |
| 6,735,043 B2 * | 5/2004 | Bernett et al. | 360/97.01 |

* cited by examiner

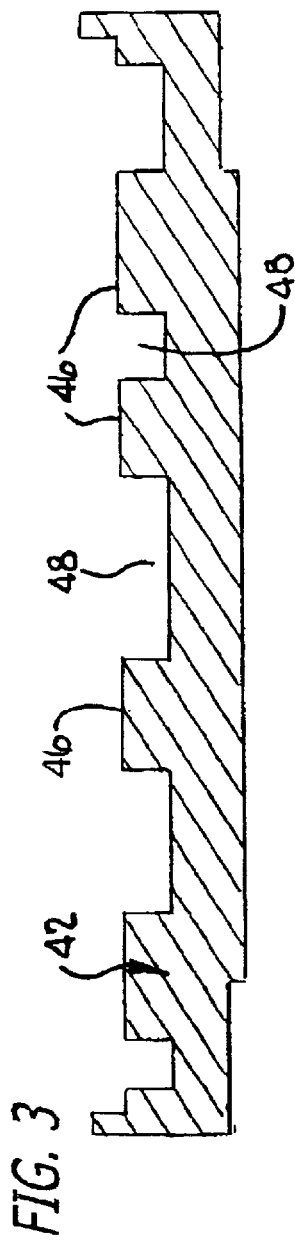
FIG. 3
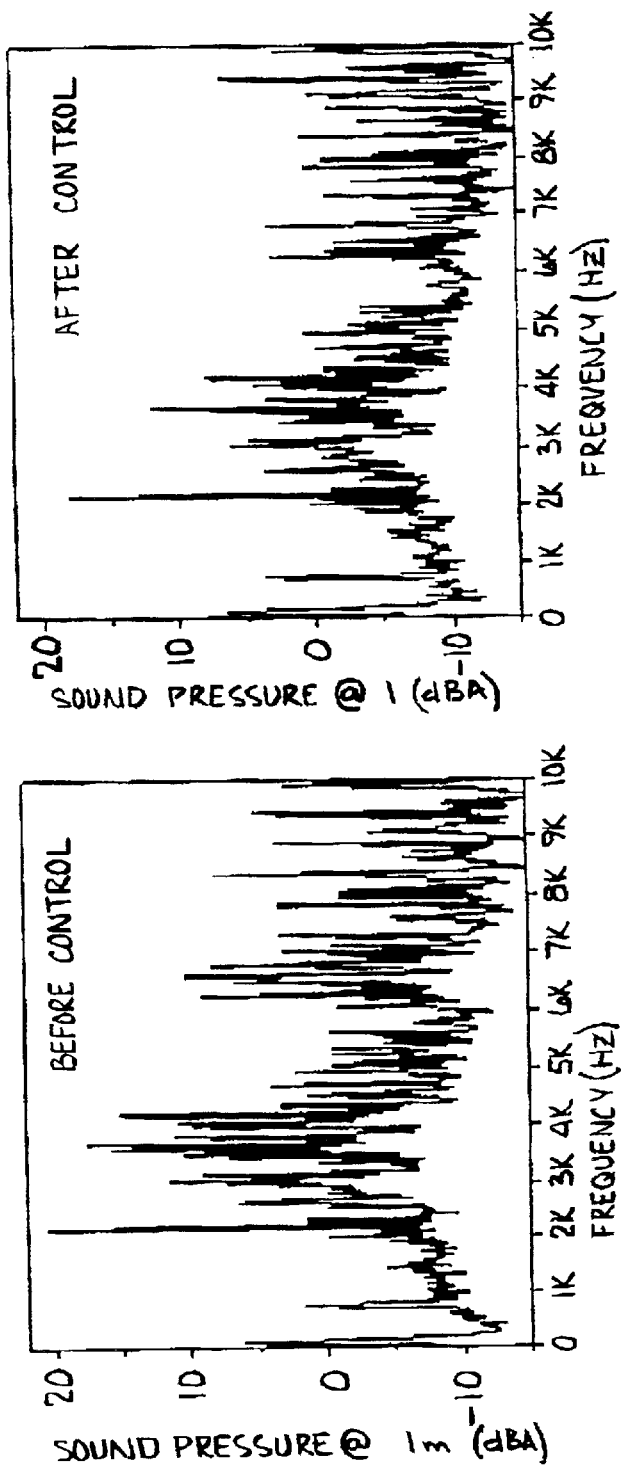
FIG. 4b
FIG. 4a PRIOR ART

WAVE STRINGER FOR CONTROLLING ACOUSTIC NOISE AND SHOCK VIBRATION IN A STORAGE DEVICE

This application claims the benefit of U.S. Provisional Application No. 60/202,551, filed May 10, 2000.

BACKGROUND OF THE INVENTION

1. Field of the Invention

The present invention relates to a wave stringer to attenuate energy that propagates through a hard disk drive.

2. Background Information

Hard disk drives contain a plurality of magnetic heads that are coupled to rotating disks. The heads write and read information by magnetizing and sensing the magnetic fields of the disk surfaces. There have been developed magnetic heads that have a write element for magnetizing the disks and a separate read element for sensing the magnetic fields of the disks. The read element is typically constructed from a magneto-resistive material. The magneto-resistive material has a resistance that varies with the magnetic fields of the disk. Heads with magneto-resistive read elements are commonly referred to as magneto-resistive (MR) heads.

Each head is attached to a suspension arm to create a subassembly commonly referred to as a head gimbal assembly ("HGA"). The HGA's are attached to an actuator arm which has a voice coil motor that can move the heads across the surfaces of the disks.

The disks are rotated by a spindle motor that is mounted to a base plate of the disk drive. The spindle motor may create a vibration that is transmitted through the base plate. The vibration may be in the audible frequency range so that the drive emits an undesirable noise. Additionally, the rotating disks may create a turbulent flow that generates a vibration in the housing which also creates an audible noise from the drive. It would be desirable to provide a structure that attenuates acoustic energy which propagates through the disk drive housing, and lowers the noise emitted from the drive.

Disk drives are sometimes subjected to external shock and/or vibration loads that may damage the internal components of the drive. It would also be desirable to provide a structure that attenuates shook/vibration waves which propagate through the housing of the drive.

BRIEF SUMMARY OF THE INVENTION

One embodiment of the present invention is a hard disk drive that includes a wave stringer which can attenuate energy within a base plate of the disk drive.

BRIEF DESCRIPTION OF THE DRAWINGS

FIG. 3 is a cross-sectional view showing a wave stringer of the hard disk drive;

FIGS. 4a–b are graphs showing acoustic noise emitted by a hard disk drive of the prior art and a disk drive of the present invention;

DETAILED DESCRIPTION OF THE PREFERRED EMBODIMENT

In general one embodiment of the present invention includes a hard disk drive that includes a wave stringer. The wave stringer can attenuate energy that propagates through a base plate of the disk drive. The wave stringer may be designed by initially analyzing propagation patterns of both acoustic and shock waves applied to the drive. The wave stringer is then designed, constructed and assembled to the disk drive to attenuate critical frequencies at weak points of the disk drive. The wave stringer may have a plurality of ribs designed to vary the mechanical impedance of the drive to attenuate the propagated energy.

Figure 1:
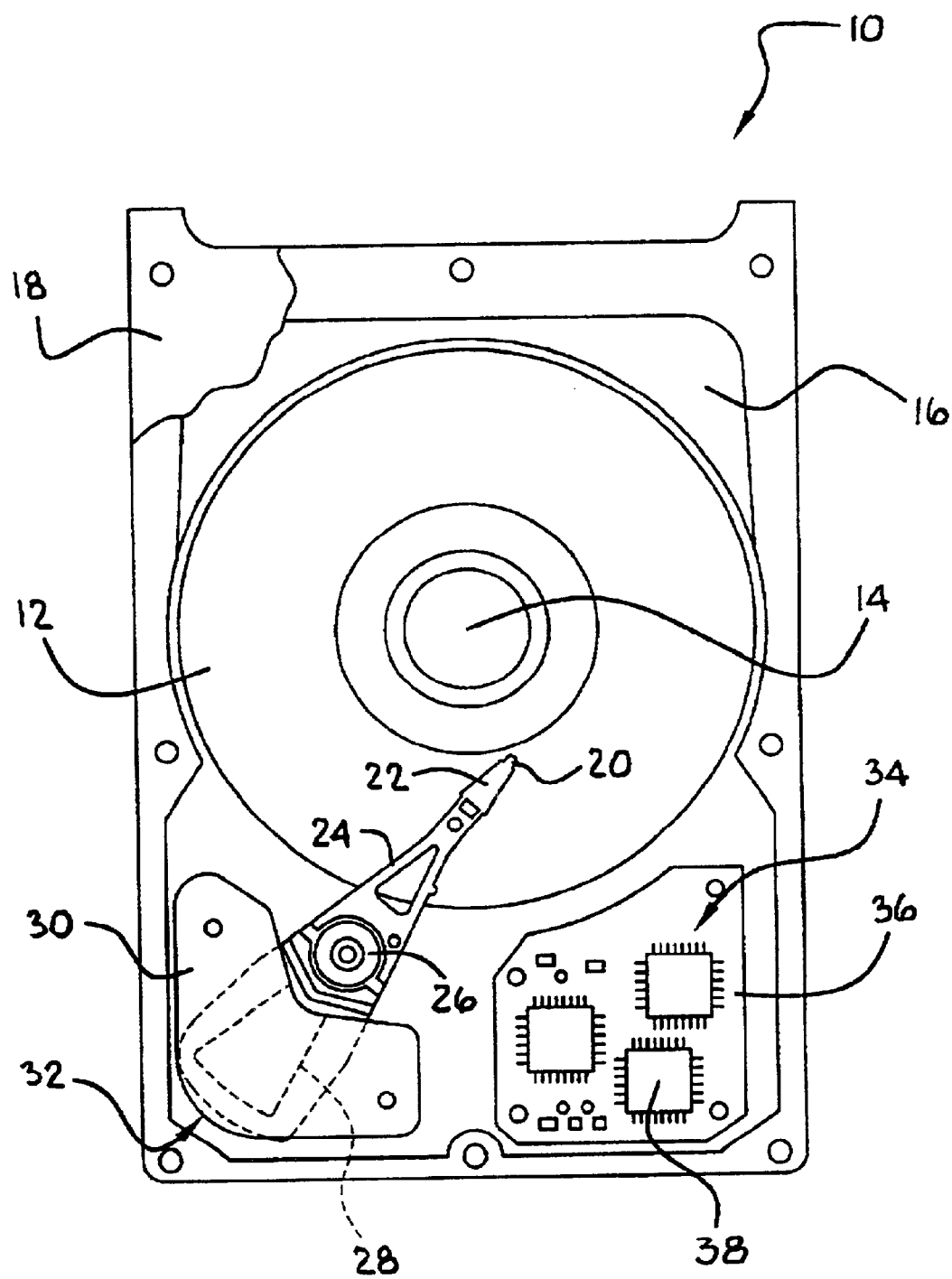
FIG. 1 is a top view of an embodiment of a hard disk drive of the present invention.

Referring to the drawings more particularly by reference numbers, FIG. 1 shows an embodiment of a hard disk drive 10 of the present invention. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. The heads 20 may have separate write and read elements (not shown) that magnetize and sense the magnetic fields of the disks 12.

Each head 20 may be gimbal mounted to a suspension arm 22 as part of a head gimbal assembly (HGA). The suspension arms 22 are attached to an actuator arm 24 that is pivotally mounted to the base plate 16 by a bearing assembly 26. A voice coil 28 is attached to the actuator arm 24. The voice coil 28 is coupled to a magnet assembly 30 to create a voice coil motor (VCM) 32. Providing a current to the voice coil 28 will create a torque that swings the actuator arm 24 and moves the heads 20 across the disks 12.

Each head 20 has an air bearing surface (not shown) that cooperates with an air flow created by the rotating disks 12 to generate an air bearing. The formation of the air bearing and the general operation of the head 20 is a function of a force exerted by the suspension arm 22. The force is commonly referred to as the gram load of the arm 22. A higher gram load corresponds to a stiffer suspension arm 22.

The hard disk drive 10 may include a printed circuit board assembly 34 that includes a plurality of integrated circuits 36 coupled to a printed circuit board 38. The printed circuit board 36 is coupled to the voice coil 28, heads 20 and spindle motor 14 by wires (not shown).

Figure 2:
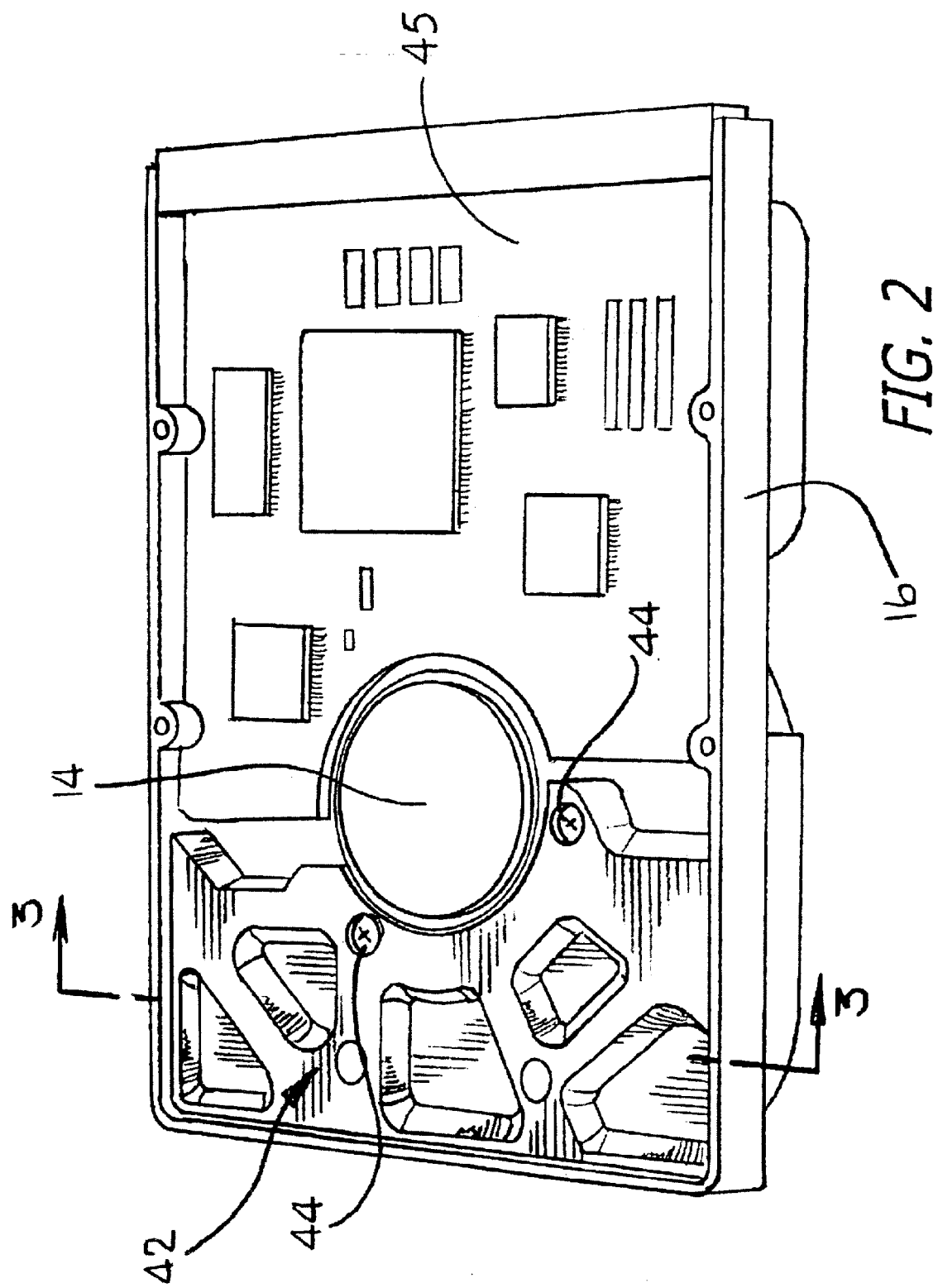
FIG. 2 is a bottom view of the hard disk drive.

FIG. 2 shows a wave stringer 42 that is attached to the base plate 16 by a plurality of fasteners 44. The wave stringer 42 can vary the mechanical impedance of the base plate 16 and attenuate energy that propagates through the disk drive 10. For example, the wave stringer 42 can vary the disk drive structure to attenuate acoustic energy that propagates through the drive, or attenuate shock/vibration energy that propagates through the drive. The wave stringer 42 is located adjacent to the printed circuit board assembly 45.

As shown in FIG. 3, the wave stringer 42 may have a plurality of ribs 46 separated by channels 48. The ribs 46 and channels 48 may be designed to optimize the attenuation of energy in the disk drive 10. The width and location of the ribs 46 may be unsymmetric to reduce the harmonics in the drive.

The wave stringer 42 may be designed by initially determining and analyzing the sound intensity radiation pattern over the entire outside surface of the base plate 16 and cover 18. Additionally, analysis may be performed on the operational deflection of the base plate 16. The weak points of the base plate 16 can then be identified to determine where the wave stringer 42 should be attached to the drive and how the stringer 42 should be configured to attenuate the acoustic energy.

As part of the design process for the wave stringer 42 shock/vibration propagation patterns may be determined and analyzed in response to an external shock and/or vibration load. Further analysis may be performed to determine critical time and critical frequencies of the shock load propagating through the disk drive. The weak points of the base plate 16 can then be identified to determine where the wave stringer 42 should be attached to the drive 10 and how the stringer 42 should be configured to attenuate the shock/vibration energy. The analysis for both the acoustic and shock/vibration energy can be performed with finite element computer generated models that identify areas of maximum base plate deflection. The models can be modified to incorporate a wave stringer design and to determine the effects of the wave stringer. The wave stringer can be iteratively varied and analyzed to provide an optimum design.

The wave stringer 42 may be attached to the base plate 16 adjacent to the spindle motor 14. This placement of the wave stringer 42 will more effectively attenuate vibration energy generated by the motor 14.

FIGS. 4a and 4b show an attenuation of acoustic energy for a hard disk drive of the prior art without a wave stringer 42 and a disk drive 10 of the present invention with a wave stringer 42. In general the wave stringer 42 reduces noise levels across the entire frequency spectrum. As shown by FIGS. 4a and 4b, some of the high frequency components have noise reductions up to 4 decibels.

Figure 5:
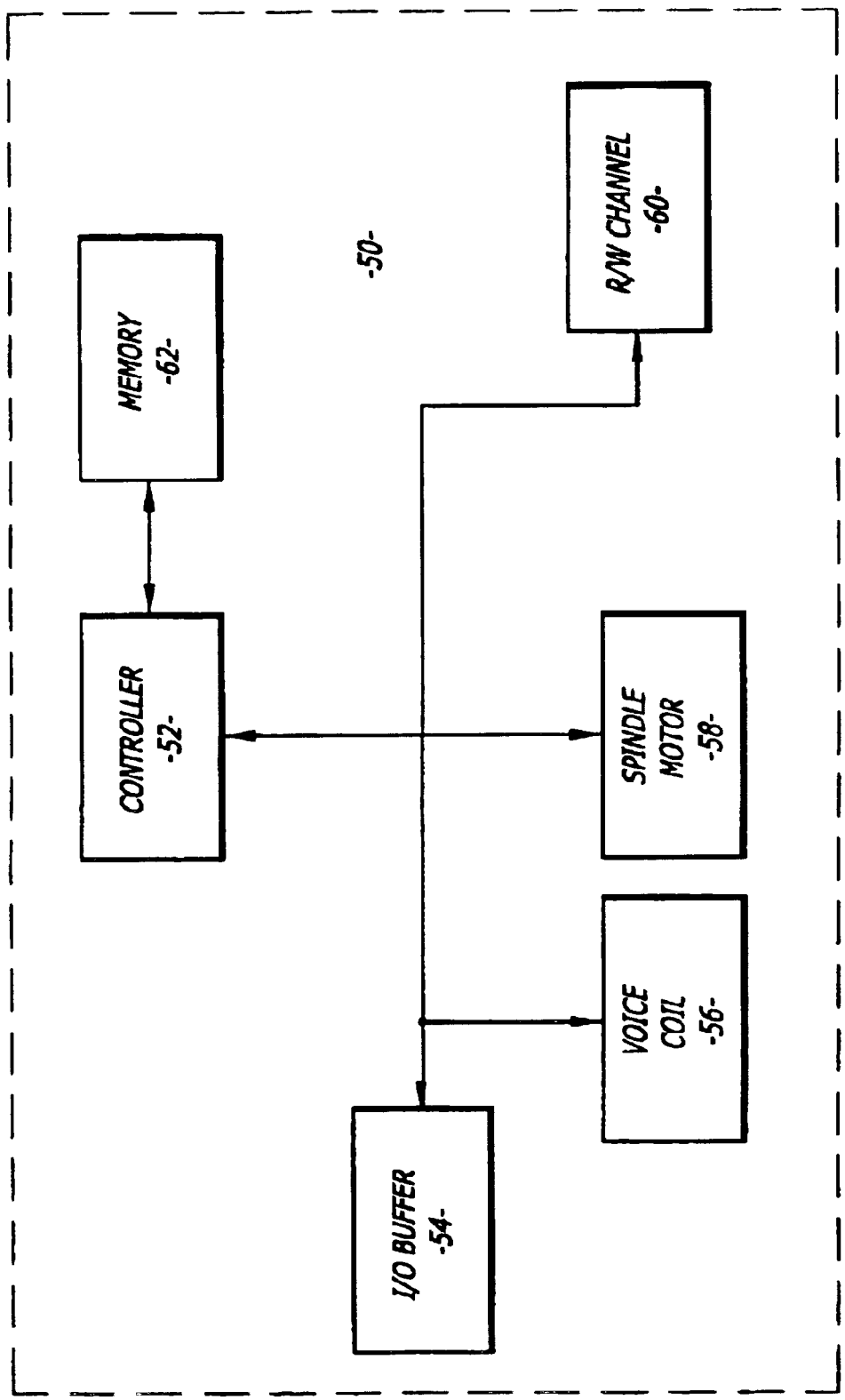
FIG. 5 is a schematic of an electrical system of the hard disk drive.

FIG. 5 shows a schematic of an electrical system 50 that can control the disk drive 10. The electrical system 50 may be integrated into the printed circuit board assembly 36 shown in FIG. 1. The system 50 includes a controller 52 that is connected to an input/output (I/O) buffer 54, voice coil motor control circuit 56, spindle motor control circuit 58, read/write channel circuit 60, memory 62. The I/O buffer 54 provides an interface with an external source such as a personal computer. The voice coil control circuit 56 and spindle motor control circuit 58 contain drivers, etc. to control the voice coil motor and spindle motor, respectively.

The voice coil motor circuit 56 and spindle motor control circuit 58 operate in accordance with signals, commands, etc. from the controller 52. The controller 52 may be a processor that can perform software routines in accordance with instructions and data to operate the storage and retrieval of information from the disks 12.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. For example, although the wave stringer 42 is shown and described as being attached to the base plate 16, the stringer 42, or an additional stringer 42, may be attached to the cover 18.

What is claimed is:

1. A hard disk drive, comprising:

a base plate that has an external cavity;

a spindle motor coupled to said base plate;

a disk coupled to said spindle motor;

an actuator arm mounted to said base plate;

a voice coil motor coupled to said actuator arm;

a suspension arm coupled to said actuator arm, said suspension arm having a gram load;

a head coupled to said suspension arm and said disk;

a printed circuit board assembly located in said external cavity a wave stringer attached to said base plate within said external cavity and located adjacent to said printed circuit board in a non-overlapping manner, said wave stringer having a plurality of non-through hole openings that separate a plurality of ribs configured and located relative to said base plate to optimize attenuation of energy propagating through said base plate; and, a cover that is attached to said base plate and encloses said disk, said actuator arm, said voice coil motor, said suspension arm and said head.

2. The hard disk drive of claim 1, wherein said wave stringer is adjacent to said spindle motor.

3. The hard disk drive of claim 1, wherein said wave stringer attenuates vibration energy created by said spindle motor.

4. The hard disk drive of claim 1, wherein said wave stringer attenuates shock energy from an external source.

5. The hard disk drive of claim 1, wherein said wave stringer ribs are unsymmetrical.

6. A hard disk drive, comprising:

a base plate that has an external cavity;

a spindle motor coupled to said base plate;

a disk coupled to said spindle motor;

an actuator arm mounted to said base plate;

a voice coil motor coupled to said actuator arm;

a suspension arm coupled to said actuator arm, said suspension arm having a gram load;

a head coupled to said suspension arm and said disk;

a printed circuit board assembly located in said external cavity;

attenuation means for optimizing the attenuation of energy propagating through said base plate that is located within said external cavity of said base plate and adjacent to said printed circuit assembly in a non-overlapping manner; and, a cover that is attached to said base plate and encloses said disk, said actuator arm, said voice coil motor, said suspension arm and said head.

7. The hard disk drive of claim 6, wherein said attenuation means includes a plurality of ribs.

8. The hard disk drive of claim 6, wherein said attenuation means is adjacent to said spindle motor.

9. The hard disk drive of claim 6, wherein said attenuation means attenuates vibration energy created by said spindle motor.

10. The hard disk drive of claim 6, wherein said attenuation means attenuates shock energy from an external source.

11. The hard disk drive of claim 7, wherein said ribs are unsymmetrical.

* * * * *